Figure 1:
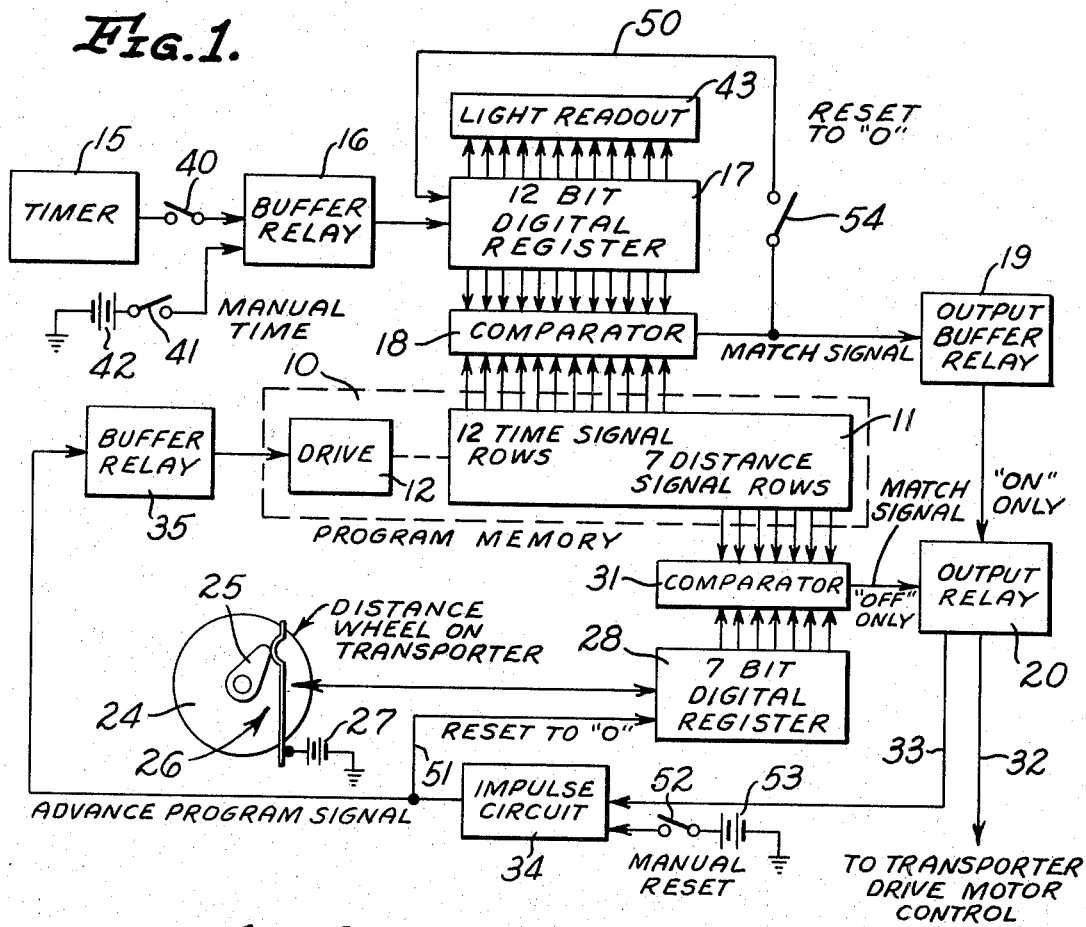

United States Patent [19]

Baker

[11] 3,858,832

[45] Jan. 7, 1975

[54] CONTROL SYSTEM FOR AIR CUSHION TRANSPORTER

[75] Inventor: Terry M. Baker, Santa Barbara, Calif.

[73] Assignee: Rolair Systems, Inc., Santa Barbara, Calif.

[22] Filed: Aug. 1, 1973

[21] Appl. No.: 384,452

[52] U.S. Cl. ...... 246/182 R, 246/187 R, 246/187 B
[51] Int. Cl. ............................................ B61l 23/16
[58] Field of Search ........ 246/167 R, 182 R, 182 B, 246/182 C, 187 R, 187 B; 180/98, 105 E

[56] References Cited
UNITED STATES PATENTS
3,559,820  2/1971  Munson.......................... 246/182 B
3,748,466  7/1973  Sibley et al..................... 246/187 B
3,752,084  8/1973  Riondel.......................... 246/182 C

*Primary Examiner*—M. Henson Wood, Jr.
*Assistant Examiner*—Reinhard J. Eisenzopf
*Attorney, Agent, or Firm*—Harris, Kern, Wallen & Tinsley

[57] ABSTRACT

An automatic control for an air cushion transporter vehicle or the like suitable for use in step wise movement of a load along a path, such as an assembly line. A stored program of time and distance steps with a time signal source and time comparator for initiating movement after a predetermined time, and with a movement signal source and distance comparator for terminating movement after a predetermined distance, and means for advancing the program to the next step. An automatic control which may be self contained and carried on board the vehicle.

6 Claims, 2 Drawing Figures

CONTROL SYSTEM FOR AIR CUSHION TRANSPORTER

This invention relates to automatic controls for air cushion transporter vehicles and the like, and in particular to an automatic control which may be self-contained and carried on board the vehicle.

As assembly line with a plurality of self-propelled load carriers or transporters of the air cushion type, and a control system for automatic control of movement of the transporters is described in copending application Ser. No. 326,792, filed Jan. 26, 1973, entitled Automated Assembly Line With Air Cushion Devices, and assigned to the same assignee as the present application. The present application provides a new and improved automatic control that is particularly suited for use with the air cushion transporter of the aforesaid copending application to provide control of individual transporters independent of other transporters moving along the assembly line. However, it is recognized that the automatic control of the invention may be utilized for control of other vehicles and is not limited to such specific air cushion transporters.

A typical air cushion transporter comprises a platform or pallet or other load supporting member and a plurality of air bearings carried under the platform. Compressed air is delivered to the air bearings which generate a film of air between the transporter and the ground surface or path, resulting in a very low friction between the transporter and the path. Movement is provided by a drive motor in the transporter, typically an air powered motor which is controlled by an on-off valve. The present invention provides a means of actuating the on-off valve or other motor control, to control the movement of the transporter. The automatic control of the present invention provides an independent and preprogrammable movement sequence for each transporter, as contrasted to centralized assembly line advance control of the prior art. Also, the automatic control of the present invention eliminates the need for a fixed control system, eliminates the constraint of stopping transporter vehicles at fixed stations, and permits each vehicle to travel an independent path.

The automatic control may include means for storing a program of time and distance steps, and means for generating time and distance signals as functions of elasped time and distance travelled for comparison with the programmed times and distances, and means for initiating and terminating vehicle movement when time and distance matches occur. In operation, the vehicle remains stationary for a predetermined length of time and then moves a predetermined distance, after which the program is advanced to a new time and distance for a repeat of the operation. Other advantages, features, and results will more fully appear in the course of the following description.

Figure 2:
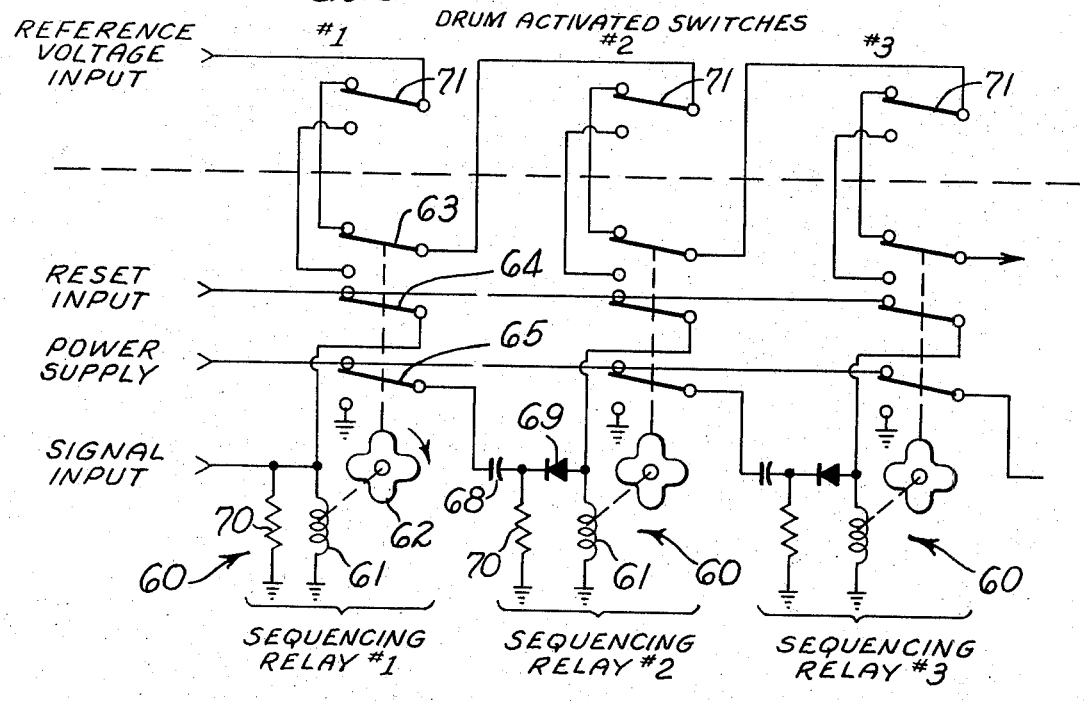

IN THE DRAWING:

FIG. 1 is a block diagram of an automatic control for a vehicle incorporating the presently preferred embodiment of the invention; and FIG. 2 is a circuit diagram of a register and comparator utilizing sequencing relays and suitable for use in the control of FIG. 1.

The automatic control as illustrated in the drawing includes a program memory 10, typically having a program drum 11 and a drum drive 12. The automatic control also includes a timer 15, a buffer relay 16 and a twelve bit digital register 17. A time comparator 18 has inputs from the register 17 and program memory 10, and provides an output to a buffer relay 19 which in turn drives an output relay 20.

A wheel 24 which rotates as the transporter moves, carries a cam 25 for closing a switch 26 every revolution of the wheel, connecting a pulse from a power source 27 as an input to a 7 bit digital register 28. A distance comparator 31 has inputs from the register 28 and the memory 10, providing an output to the relay 20. The relay 20 provides an output on line 32 to the control for the transporter drive motor. Relay 20 also provides an output on line 33 through an impulse circuit 34 and a buffer relay 35 to the drive 12 of the memory 10.

Various forms of program memory may be used to provide the time and distance step signals. The electro mechanical rotating program drum is the presently preferred device. A typical drum may be driven in rotation in 60 steps, providing for storage of 60 sets of time and distance step signals. The particular drum illustrated utilizes 12 time signal rows and 7 distance signal rows, with an electrical switch for each row. Information is stored in the drum by inserting pins at predetermined locations for actuating selected switches at each step position of the drum. A time step signal provides a measure of the length of time the vehicle remains stationary, and a distance step signal provides a measure of the distance the vehicle travels at the end of the time. In the particular embodiment illustrated, binary signals are utilized with a 12 bit output for the time signal and a 7 bit output for the distance signal. With a 30 second interval per bit, the 12 bit signal provides in excess of 34 hours program time, and with one foot per bit, the 7 bit distance signal provides movements up to 128 feet.

The timer 15 provides an output pulse per predetermined time intervals, typically each 30 seconds, with the register 17 being advanced one count per time pulse. The time pulse input may be shutoff at any time by opening switch 40. Also, the time interval between movements may be shortened by manually introducing time pulses via switch 41 and power source 42. A readout unit 43 may be utilized to provide a visual display of the state of the time register 17, if desired.

The relay 20 has an on position and an off position, providing a control signal to the transporter to move the transporter when in the on position. The relay 20 is moved to the on position by a signal from the time comparator 18 and is moved to the off position by a signal from the distance comparator 31. The registers and comparators may be solid state devices of conventional design, or may be electromechanical devices, as desired. In the presently preferred embodiment, the time register 17 and time comparator 18 is constructed with 12 sequencing relays connected in series to form a register operating in the same manner as a binary flip-flop chain. Each sequencing relay has on and off or zero and one positions, and remains in a position until switched to the other position. The relays also remain in the most recent position when power is off, thereby providing a permanent memory during power interruptions. One set of contacts on each relay is used to provide the sequencing chain. A second set of contacts is used to serve as the comparator, with the relay contacts connected in series with the contact switches of the program memory. A match signal is then produced when a circuit is completed through predetermined relay contacts and memory contacts as determined by the pins on the memory drum. This operation is analogous to that of the solid state comparator which provides an output or match signal when there is coincidence between 12 bit signal from a register and the 12 bit signal from a memory. The distance register 28 and distance cmparator 31 may be the same as the time register 17 and time comparator 18. The time register 17 may be reset to zero via reset line 50 and switch 54. Alternatively, the reset may be omitted, with total elapsed time being indicated at the readout 43. The distance register 28 similarly may be reset via line 51 if desired. Manual termination of movement may be provided by manually resetting the register 28 via a switch 52 and power source 53, if desired.

In use, the automatic control may be utilized to program the movement of a transporter along an assembly line. First, the length of time to be spent at each station and the distance from one station to the next are determined. These may be referred to as the time and distance steps. The first time step and the first distance step are set on the first step of the memory drum. Subsequent time steps and distance steps are set on subsequent steps of the drum. The transporter is moved to the first station, as by manual override of the automatic control, the registers are set or reset to the zero positions, the memory drum is advanced to the first step, and timer pulses are connected to the time register via switch 40. The transporter remains stationary until there is a match between the time signal from the memory and the time signal in the time register. When the match occurs, the relay 20 is switched to the on position and provides an output to the drive motor control. The drive motor of the transporter is now energized and the transporter is advanced. As the transporter moves, the distance wheel 24 rotates actuating the switch 26 and advancing the distance register. When the predetermined distance has been covered, there is a match at the distance comparator and the relay 20 is switched to the off position, which denergizes the transporter drive motor. The output relay also provides a signal on line 33 which energizes the program drive 12 and advances the drum to the next step, with the operating sequence being repeated.

With this automatic control, the transporter has a self-contained, independent and preprogrammable movement sequence which permits the transporter to move independent of other transporters and which also permits manual override when desired and change of the program sequence as desired. The automatic control may be completely self-contained with battery operation and can be placed on board the transporter, thereby freeing the transporter of any electrical or control connections to fixed stations.

A register and comparator utilizing sequencing relays is shown in FIG. 2. Only 3 bits are illustrated, but any number may be utilized by incorporating additional drum switches and sequencing relays. Three sequencing relays 60 are illustrated and each includes a solenoid coil 61 driving a cam 62 which operates electrical contact sets 63, 64 and 65. The contact sets 63 and 65 are single pole double throw, and the contact set 64 is single pole single throw. With the four lobe cam illustrated, the relay has eight steps per cam revolution, with the cam being rotated 45° each time the solenoid 61 is energized.

A power supply is connected to one fixed contact of the set 65, with the other fixed contact connected to circuit ground. The moving arm of the set 65 is connected through a capacitor 68 to the solenoid coil of the next relay in the sequence. The reset voltage is connected to one contact of the set 64, with the other contact connected to the solenoid coil 61. The contact set 63 is connected in a series connection with a corresponding drum actuated switch of the program memory to form the comparator.

In operation, the solenoid coil of the first sequencing relay is energized by each input pulse, as from the buffer relay 16 or the switch 26, advancing the cam 62 one step and reversing the positions of the three contact sets 63, 64, 65. Each time the moving arm of contact set 65 is connected to the power supply, power is applied to the solenoid coil of the next relay in the sequence causing it to advance one step. That is, each relay in the chain is advanced one step for every second step advance of the preceding relay in the chain. The capacitor 68 serves as an energy conservation device, allowing a controlled amount of energy sufficient to operate the next relay to pass and then stops current flow. The diode 69 and the resistors 70 provide impulse damping and a discharge path for the capacitor 68 when the moving arm of the contact set 65 of the preceding relay is connected to circuit ground. The chain of sequencing relays functions as a register operating in the manner of a binary flip-flop chain. The contact sets 63 can be used to provide a parallel binary output if desired, by providing a reference voltage input to the moving arm of each set and utilizing one of the fixed contacts for the binary output from each relay.

A preferred use of the sequencing relays in combination with the drum actuated switches of the program memory to form the comparator is illustrated in FIG. 2. As described previously, selectively positioned pins of the drum actuate switches as the drum rotates. Three single pole double throw switches 70 are illustrated in FIG. 2, with a drum switch 70 for each contact set 63 of the chain of sequencing relays. A reference voltage is connected to the moving arm of the first drum switch 70, with the fixed contacts of the drum switch and corresponding sequencing relay contact set connected in parallel. Moving arm of the sequencing relay set is connected to the moving arm of the next drum switch to form the series connection as illustrated. Variations in the interconnections will be readily apparent to those skilled in this field.

When all of the drum switches and all of the sequencing switches are in a particular condition, the reference voltage will appear at the output of the last relay as the match signal. This particular condition is illustrated in FIG. 2. If one of these switches is reversed, there will not be a completed series through the switches and hence no voltage at the output.

I claim:

1. An automatic control for an air cushion transporter vehicle or the like having a drive motor for propelling the vehicle and a motor control for the drive motor, the improvement comprising in combination:

storage means for storing a program defining a movement sequence with time and distance steps, and providing as outputs for each step a time step signal and a distance step signal;

advance means for actuating said storage means to advance to the next steps;

a time signal source providing output pulses as a function of time;

a time register having said time signal source as an input and providing a lapsed time signal;

a time comparator having said lapsed time signal and said time step signal as inputs and providing a first match signal as an output when said inputs are matched;

an output control having an on position providing an output to the motor control for energizing the drive motor, and an off position providing an output to the motor control for denergizing the drive motor;

a distance signal source providing output pulses as a function of movement of the vehicle;

a distance register having said distance signal source as an input and providing an actual distance signal;

a distance comparator having said actual distance signal and said distance step signal as inputs and providing a second match signal as an output when said inputs are matched;

means for coupling said first match signal to said output control for switching to said on position;

means for coupling said second match signal to said output control for switching to said off position; and means coupling said output control to said advance means for advancing said storage means when said output control switches to said off position.

2. An automatic control as defined in claim 1 including means for resetting said time register after a first match signal.

3. An automatic control as defined in claim 1 including means for resetting said distance register after a second match signal.

4. An automatic control as defined in claim 1 wherein said storage means includes:
   a plurality of switches;
   a drum driven in rotation a step at a time by said advance means; and
   a plurality of switch actuating pins positioned on said drum in a predetermined pattern for actuating selected switches at each drum step, with said switches providing said time and distance step signals.

5. An automatic control as defined in claim 1 wherein at least one of said registers comprises a plurality of sequencing relays connected in a series chain.

6. An automatic control as defined in claim 5 wherein said storage means includes a plurality of single pole double throw switches and means for actuating selected switches, and
   wherein each of said sequencing relays includes a single pole double throw contact set, and
   means for interconnecting said storage means switches and sequencing relay contact sets in series to form a comparator.

* * * * *